US011940783B2

(12) United States Patent
Choi

(10) Patent No.: US 11,940,783 B2
(45) Date of Patent: Mar. 26, 2024

(54) COMPUTING SYSTEM FOR ANALYZING FACTORY AND METHOD OF USING THE COMPUTING SYSTEM TO MANAGE FACTORY

(71) Applicant: Sang Su Choi, Seongnam-si (KR)

(72) Inventor: Sang Su Choi, Seongnam-si (KR)

( * ) Notice: Subject to any disclaimer, the term of this patent is extended or adjusted under 35 U.S.C. 154(b) by 393 days.

(21) Appl. No.: 17/282,945

(22) PCT Filed: Oct. 4, 2019

(86) PCT No.: PCT/KR2019/013031
§ 371 (c)(1),
(2) Date: Apr. 5, 2021

(87) PCT Pub. No.: WO2020/076012
PCT Pub. Date: Apr. 16, 2020

(65) Prior Publication Data
US 2021/0389757 A1    Dec. 16, 2021

(30) Foreign Application Priority Data
Oct. 8, 2018    (KR) .......................... 10-2018-0119847

(51) Int. Cl.
*G05B 19/418*    (2006.01)
*G06Q 10/00*    (2023.01)
(Continued)

(52) U.S. Cl.
CPC ... *G05B 19/41885* (2013.01); *G06Q 10/0633* (2013.01); *G06Q 10/067* (2013.01);
(Continued)

(58) Field of Classification Search
CPC .... G05B 19/41885; G05B 2219/32339; G05B 2219/32347; G05B 19/4183;
(Continued)

(56) References Cited

U.S. PATENT DOCUMENTS 7,379,782 B1 * 5/2008 Cocco .................... G06Q 10/06
703/2
7,660,680 B1 * 2/2010 Parraga ............... G01F 15/0755
700/121

(Continued)

FOREIGN PATENT DOCUMENTS

CN     106530405 B     3/2019
CN     107885336 B     4/2021
(Continued)

OTHER PUBLICATIONS

International Search Report of the International Searching Authority, dated Jan. 15, 2020, from International Application No. PCT/KR2019/013031, filed on Oct. 4, 2019. 5 pages.
(Continued)

*Primary Examiner* — Ramesh B Patel
(74) *Attorney, Agent, or Firm* — HoustonHogle LLP

(57) ABSTRACT

A computing system for building a virtual factory includes database and a virtual factory building module. The database stores modeling data. The virtual factory building module builds the virtual factory in which a progress situation of a work performed from a first portion to a second portion is displayed, based on the modeling data and a time difference between an output time of a first signal and an output time of a second signal, which is calculated based on the first signal output when a product is at a first portion on one or more facilities monitored from a first location present in an outside of the one or more facilities used in a real factory and the second signal output when the product is at a second portion on the one or more facilities monitored from a second location present in the outside of the one or more facilities. The first location is spaced from the second location, and the first portion is spaced from the second portion.

10 Claims, 13 Drawing Sheets

(51) Int. Cl.

| | |
|---|---|
| *G06Q 10/06* | (2023.01) |
| *G06Q 10/0633* | (2023.01) |
| *G06Q 10/067* | (2023.01) |
| *G06Q 10/20* | (2023.01) |
| *G06Q 50/04* | (2012.01) |
| *G06T 7/00* | (2017.01) |
| *G07C 3/00* | (2006.01) |

(52) U.S. Cl.
CPC ............. *G06Q 10/20* (2013.01); *G06Q 50/04* (2013.01); *G06T 7/0004* (2013.01); *G07C 3/005* (2013.01); G05B 2219/32339 (2013.01); G05B 2219/32347 (2013.01); *G06T 2207/30164* (2013.01)

(58) Field of Classification Search
CPC .............. G05B 19/4184; G05B 19/408; G05B 19/41845; G06Q 10/0633; G06Q 10/067; G06Q 10/20; G06Q 50/04; G06Q 10/063; G06T 7/0004; G06T 2207/30164; G07C 3/005
See application file for complete search history.

(56) References Cited

U.S. PATENT DOCUMENTS

| | | | | |
|---|---|---|---|---|
| 8,843,221 | B2* | 9/2014 | Wang | G05B 23/0232 700/79 |
| 10,061,299 | B2 | 8/2018 | Herrman et al. | |
| 10,310,472 | B2* | 6/2019 | Matergia | G05B 19/056 |
| 10,360,193 | B2* | 7/2019 | Sarkar | G06F 16/219 |
| 10,977,749 | B2* | 4/2021 | Widner | G06Q 50/04 |
| 11,204,597 | B2* | 12/2021 | Small | G06Q 20/065 |
| 11,207,584 | B2* | 12/2021 | Tran | G16H 50/20 |
| 11,288,945 | B2* | 3/2022 | Kolavennu | G08B 21/0438 |
| 2002/0193972 | A1 | 12/2002 | Kudo et al. | |
| 2006/0155402 | A1 | 7/2006 | Read | |
| 2014/0350708 | A1* | 11/2014 | Kobayashi | G06Q 10/06 700/108 |
| 2020/0050712 | A1* | 2/2020 | Santarone | G06T 19/006 |
| 2020/0065759 | A1* | 2/2020 | McNamara | G05B 17/02 |
| 2021/0132582 | A1* | 5/2021 | Biernat | H04L 9/3239 |
| 2021/0245284 | A1* | 8/2021 | Albrecht | B23K 9/1006 |
| 2023/0186201 | A1* | 6/2023 | Cella | H04L 67/562 705/7.17 |

FOREIGN PATENT DOCUMENTS

| | | |
|---|---|---|
| EP | 2 755 096 A1 | 4/2012 |
| JP | H1195833 A | 4/1999 |
| JP | 2002-520701 A | 7/2002 |
| JP | 2002-373018 A | 12/2002 |
| JP | 2007310893 A | 11/2007 |
| JP | 2016-536672 A | 11/2016 |
| KR | 10-2009-0123051 | 12/2009 |
| KR | 10-2009-0123053 | 12/2009 |
| KR | 10-2010-0105826 | 9/2010 |
| KR | 10-2012-0075270 | 7/2012 |
| KR | 10-2013-0014810 | 2/2013 |
| KR | 10-2014-0141313 | 12/2014 |
| KR | 10-2015-0071201 | 6/2015 |
| KR | 10-2016-0081480 | 7/2016 |
| KR | 10-1646444 | 8/2016 |
| KR | 20180098830 A | 9/2018 |
| WO | 2008116282 A1 | 10/2008 |
| WO | 2013035687 A1 | 3/2013 |

OTHER PUBLICATIONS

Written Opinion of the International Searching Authority, dated Jan. 15, 2020, from International Application No. PCT/KR2019/013031, filed on Oct. 4, 2019. 4 pages.

Anonymous, "Factory Design and Improvement (FDI) Activity Model," NIST (https://www.nist.gov/services-resources/software/factory-design-and-improvement-fdiactivity-model), 2018.

Choi, S. et al., "A diagnosis and evaluation method for strategic planning and systematic design of a virtual factory in smart manufacturing system," International Journal of Precision Engineering and Manufacturing, 1107-1115, 2015.

Choi, S. et al., "Digital manufacturing in smart manufacturing system: contribution, barriers, and future directions," APMS, 21-29, 2015.

Choi, S. et al., "The Integrated Design and Analysis of Manufacturing Lines (I)—an Automated Modeling & Simulation System for Digital Virtual Manufacturing," Transactions of the Society of CAD/CAM Engineers, 19(2):138-147. Jun. 2014.

Choi, S. et al., "The Integrated Design and Analysis of Manufacturing Lines (II)—Continuous Design, Analysis and Optimization through Digital Virtual Manufacturing," Transactions of the Society of CAD/CAM Engineers, 19(2);148-156. Jun. 2014.

Jung, K. et al., "A Reference Activity Model for Smart Factory Desugn and Improvement," Production Planning & Control, 28(2), 108-122, 2016.

International Preliminary Report on Patentability, dated Apr. 22, 2021, from International Application No. PCT/KR2019/013031, filed on Oct. 4, 2019. 16 pages.

Choi, S. et al., "Applications of the Factory Design and Improvement Reference Activity Model", IFIP International Conference on Advances in Production Management Systems (APMS), Sep. 2016. 9 pages.

Song, I. et al., "Development of Sketch-Based 3-D Modeling System for Rapid Generation and Evaluation of Automotive Seat Shape Using Reference Models", Journal of Mechanical Design, vol. 136, May 2014. 12 pages.

Shin, S.-J. et al., "Standard Data-Based Predictive Modeling for Power Consumption in Turning Machining", Sustainibility, vol. 10(3), 2018. 19 pages.

Shin, S.-J. et al., "Energy efficiency of milling machining: Component modeling and online optimization of cutting parameters", Journal of Cleaner Production, vol. 161, 2017. 12-29.

Choi, S. et al., "An Analysis of Technologies and Standards for Designing Smart Manufacturing Systems", Journal of Research of the National Institute of Standards and Technology, vol. 121, 2016. 422-433.

\* cited by examiner

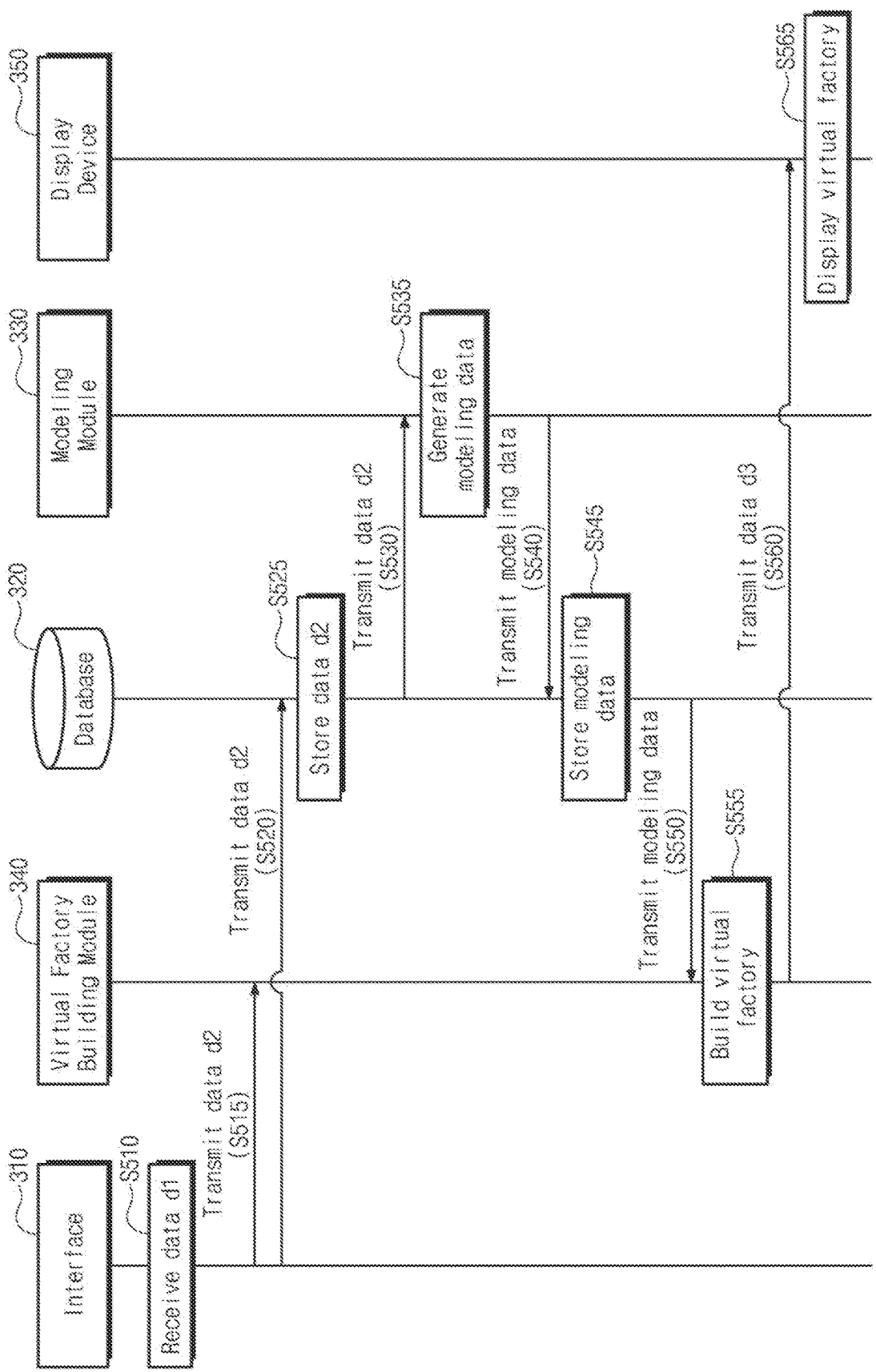

COMPUTING SYSTEM FOR ANALYZING FACTORY AND METHOD OF USING THE COMPUTING SYSTEM TO MANAGE FACTORY

RELATED APPLICATIONS

This application is a § 371 National Phase Application of international Application No. PCT/KR2019/013031, filed on Oct. 4, 2019, now International Publication No, WO 2020/076012 A1, published on Apr. 16, 2020, which International Application claims priority to Korean Application 10-2018-0119847, filed on Oct. 8, 2018, both of which are incorporated herein by reference in their entirety.

TECHNICAL FIELD

The present disclosure relates to a computing system, and more particularly, relates to a computing system for analyzing a factory and a method of using the computing system to manage the factory.

BACKGROUND ART

Factory automation refers to automatizing overall procedures for control, management, and operation of a factory producing products by using robots, computers, and the like. Nowadays, as information technology (IT) develops, a smart factory is being introduced beyond factory automation. The smart factory is an intelligent factory capable of improving productivity of a factory and product quality by applying information and communication technologies to overall processes that are performed in the factory.

One of the technologies used in the smart factory is to build a virtual factory. The virtual factory may be implemented in a virtual environment based on a result of modeling a real factory. A process that is performed in the real factory is modeled so as to be expressed by a factory model implemented in the virtual environment. Accordingly, as the virtual factory is used, even though a product is not really produced in the real factory, procedures for producing products may be virtually implemented or duplicated through simulation in the virtual environment.

DETAILED DESCRIPTION OF THE INVENTION

Technical Problem

An object of the present disclosure is directed to providing a computing system for building a virtual factory reflecting a situation of a real factory and analyzing the situation of the real factory and a method of managing the real factory by using the computing system.

Technical Solution

According to an embodiment of the present disclosure, a computing system for building a virtual factory may include a database and a virtual factory building module. The database may store modeling data. The virtual factory building module may build the virtual factory, in which a progress situation of a work performed from a first portion to a second portion is displayed, based on the modeling data and a time difference between an output time of a first signal and an output time of a second signal, which is calculated based on the first signal output when a product is at a first portion of one or more facilities monitored from a first location present in an outside of the one or more facilities used in a real factory and the second signal output when the product is at a second portion of the one or more facilities monitored from a second location present in the outside of the one or more facilities. The first location may be spaced from the second location, and the first portion may be spaced from the second portion.

According to an embodiment of the present disclosure, a method of using a computing system may include outputting, when a product is at a first portion of one or more facilities used to produce the product in a real factory, a first signal by a first monitoring device monitoring the first portion from a first location present in an outside of the one or more facilities, outputting, when the product is at a second portion of the one or more facilities different from the first portion, a second signal by a second monitoring device monitoring the second portion from a second location present in the outside of the one or more facilities, calculating a time difference between a time when the product is at the first portion and a time by a data processing module, when the product is at the second portion, based on the first signal and the second signal, and analyzing a progress situation of a first work performed from the first portion to the second portion based on the time difference by the computing system.

Advantageous Effects of The Invention

The present disclosure may gather data associated with a real factory from the real factory. According to an embodiment of the present disclosure, a monitoring device may be installed at a facility to gather data associated with the facility. Also, the monitoring device may be installed in a surrounding area adjacent to the facility to gather data associated with both the facility and a process.

The present disclosure may analyze and predict a situation of a real factory in real time by using data gathered from the real factory.

According to an embodiment of the present disclosure, because a situation of a real factory is analyzed and predicted in real time, the user may establish a producing plan capable of increasing the production of a factory with reference to the analysis result and the prediction result. Also, the user may manage works performed in a factory and products generated in the factory in an optimum state with reference to the analysis result and the prediction result.

The present disclosure may build a virtual factory, to which a situation of a real factory is reflected, by using data gathered from the real factory. Accordingly, a situation of a real factory may be displayed at a look in real time.

Also, the present disclosure may build a virtual factory on a cloud and may analyze a situation of a real factory. Accordingly, according to an embodiment of the present disclosure, users may access the virtual factory through a plurality of servers and may check a result of analyzing a situation of a real factory.

DESCRIPTION OF THE DRAWINGS

FIG. 13 is a flowchart for describing a method of building a virtual factory at a virtual factory building module of FIG. 2.

BEST MODE

Below, embodiments of the present disclosure may be described in detail and clearly to such an extent that one skilled in the art easily may carry out the present disclosure.

Figure 1:
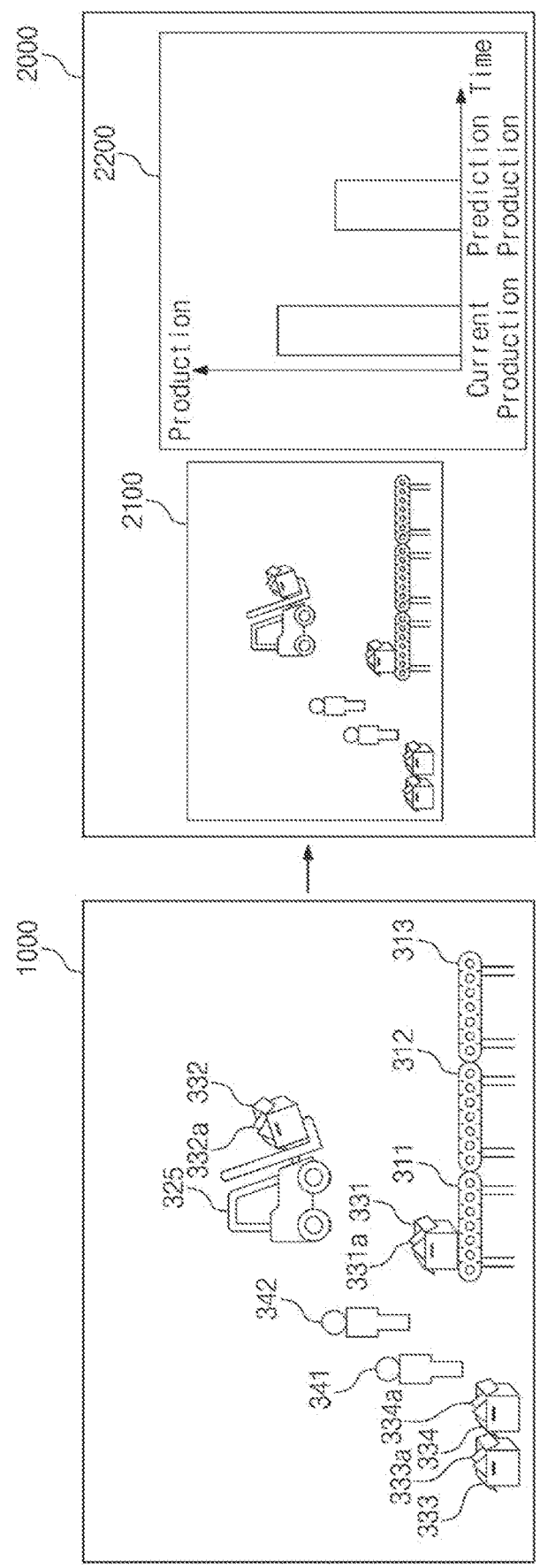
FIG. 1 is a conceptual diagram illustrating a real factory and an image displayed in a display panel of the present disclosure.

FIG. 1 is a conceptual diagram illustrating a real factory and an image displayed in a display panel of the present disclosure.

A real factory 1000 may be a physical work space that is used to produce, process, and/or pack any object or product. To this end, for example, the real factory 1000 may include facilities 311, 312, and 313, a vehicle 325, products 331a, 332a, 333a, and 334a, transport containers 331, 332, 333, and 334, and workers 341 and 342.

A real factory 1000 may be a physical work space that is used to produce, process, and/or pack any object or product. To this end, for example, the real factory 1000 may include facilities 311, 312, and 313, a vehicle 325, products 331a, 332a, 333a, and 334a, transport containers 331, 332, 333, and 334, and workers 341 and 342.

However, the real factory 1000 is illustrated by ways of example for better understanding of the present disclosure, and the present disclosure is not limited thereto. The real factory 1000 may include one or more facilities, one or more vehicles, one or more transport containers, and one or more workers and may further include components for operating the real factory 1000.

In the real factory 1000, the products 331a, 332a, 333a, and 334a may be produced and managed by the workers 341 and 342, the facilities 311, 312, and 313, the vehicle 325, and the transport containers 331, 332, 333, and 334. For example, the product 331a may be produced by the facilities 311, 312, and 313. For another example, the products 331a, 332a, 333a, and 334a may be kept or carried in a state of being put in the transport containers 331, 332, 333, and 334.

The term "work" used in the specification means one operation that is performed by the workers 341 and 342, the facilities 311, 312, and 313, and the vehicle 325 in the real factory 1000. For example, one work may be to move the product 332a by using the vehicle 325.

The term "process" used in the specification means a series of works that are performed to produce one product. For example, one process may be composed of one or more works of the following: a work for producing the product 332a by using the facilities 311, 312, and 313, a work for putting the product 332a in the transport container 332, and a work for transporting the product 332a by using the vehicle 325.

The expression "data associated with a real factory" used in the specification means data gathered from the real factory 1000. The data associated with the real factory may include data that are measured or observed (or monitored) from the facilities 311, 312, and 313, the vehicle 325, the products 331a, 332a, 333a, and 334a, the transport containers 331, 332, 333, and 334, and the workers 341 and 342.

The expression "situation of a real factory" used in the specification means a "structure of a real factory" and a "progress situation of a work being performed in a real factory". The structure of the real factory means locations of the facilities 311, 312, and 313, the vehicle 325, the transport containers 331, 332, 333, and 334, and the workers 341 and 342 in the real factory 1000. The progress situation of the work being performed in the real factory means whether the facilities 311, 312, and 313 normally operate, how much products are produced, and the like.

The present disclosure may gather data associated with the real factory 1000 from the real factory 1000 and may build a virtual factory, to which a situation of the real factory 1000 is reflected, by using the data associated with the real factory 1000. Also, the present disclosure may analyze a situation of the real factory 1000 by using the data associated with the real factory 1000.

The present disclosure may display a two-dimensional (2D) image and/or a three-dimensional (3D) image of an analysis result 2200, which is obtained by analyzing the situation of the real factory 1000, and a virtual factory 2100 in a display panel 2000. Accordingly, a user may manage the real factory 1000 with reference to the virtual factory 2100 and the analysis result 2200 displayed in the display panel 2000. With reference to the virtual factory 2100 and the analysis result 2200, the user may establish a producing plan capable of making productivity of the real factory 1000 high.

The real factory 1000, the virtual factory 2100, and the analysis result 2200 will be described in more detail with reference to FIGS. 2 to 13.

Figure 2:
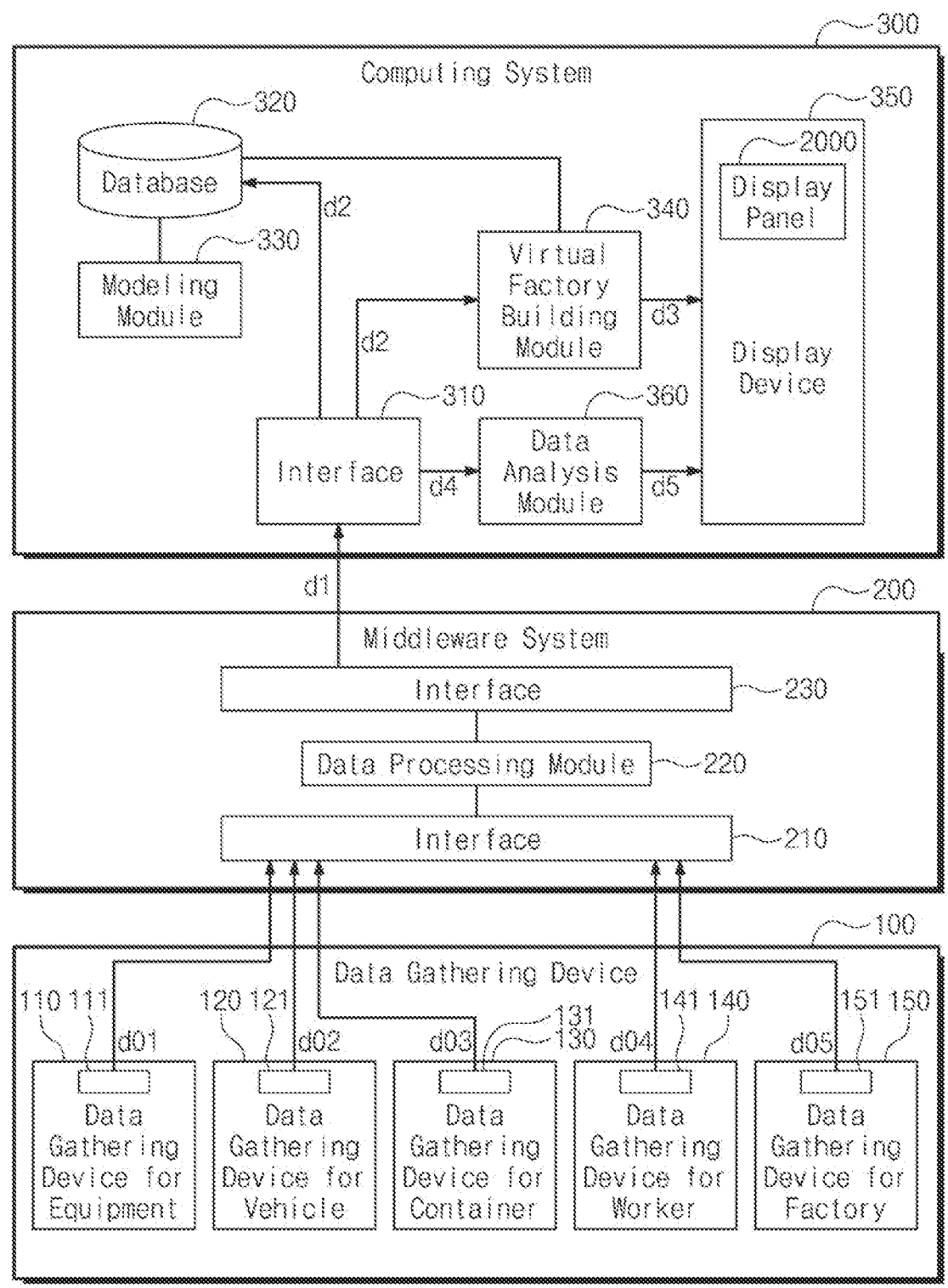
FIG. 2 is a block diagram illustrating a device and a system used to manage a real factory of FIG. 1.

FIG. 2 is a block diagram illustrating a device and a system used to manage a real factory of FIG. 1.

A data gathering device 100 may include a data gathering device for equipment 110, a data gathering device for vehicle 120, a data gathering device for container 130, a data gathering device for worker 140, and a data gathering device for factory 150. The data gathering devices 110, 120, 130, 140 and 150 may gather data d01, d02, d03, d04, and d05 associated with the real factory 1000 from the real factory 1000. The data gathering devices 110, 120, 130, 140, and 150 and the data d01, d02, d03, d04, and d05 will be described in detail with reference to FIGS. 4 to 6.

The data gathering devices 110, 120, 130, 140, and 150 may respectively output the data d01, d02, d03, d04, and d05 to a middleware system 200 through interfaces 111, 121, 131, 141, and 151. Below, for better understanding of the present disclosure, the expression "that devices and modules output and/or receive data" may be used but may mean that real devices and modules output and/or receive signals including data.

In the present disclosure, a "module" may be implemented with a hardware circuit (e.g., an analog circuit and a logic circuit) configured to perform given and/or reconfigurable operations and functions. Alternatively, a "module" may be implemented by a program code of software configured to perform given and/or programmable operations and functions, and an instruction set of the program code may be executed by a processing device (e.g., a central processing unit (CPU) or a graphic processing unit (GPU)). In some cases, a "module" may be implemented in a hybrid form of hardware and software.

The middleware system 200 may include interfaces 210 and 230 and a data processing module 220. The data gathering device 100 and a computing system 300 may communicate with each other through the middleware system 200. The middleware system 200 may use a communication technology such as TCP/IP (Transmission Control Protocol/Internet Protocol), database access middleware, DCOM (Distributed Component Object Model), CORBA (Common Object Request Broker Architecture), Bluetooth, 3G, 4G, 5G, Wi-Fi (Wireless Fidelity), or the like.

The middleware system 200 may receive the data d01, d02, d03, d04, and d05 through the interface 210. The data processing module 220 may receive the data d01, d02, d03, d04, and d05 from the interface 210. The data processing module 220 may process the data d01, d02, d03, d04, and d05 to generate data d1.

The data d1 may include information for analyzing the real factory 1000. For example, the data d01 may include information about an image taken by the data gathering device for equipment 110. The data processing module 220 may calculate a processing time taken to perform a work in the real factory 1000, by using the data d01. The data d1 may include information about a processing time. The data d01, d02, d03, d04, and d05 and the data d1 will be described in detail with reference to FIGS. 3 to 6.

As data are processed by the data processing module 220, the amount of data to be transmitted to the computing system 300 may decrease. This may mean that the amount of data to be processed by the computing system 300 decreases.

The decrease in the amount of data to be processed by the computing system 300 may also improve a speed at which the computing system 300 processes data.

The data processing module 220 may output the data d1 to the interface 230. The middleware system 200 may output the data d1 to the computing system 300 through the interface 230.

The computing system 300 may include an interface 310, database 320, a modeling module 330, a virtual factory building module 340, a display device 350, and a data analysis module 360. In some embodiments, the computing system 300 may further include a processing (or computing) device configured to execute an instruction set of a program code for some operations and functions, which is implemented by software, and a memory for storing data to be used by the processing device. Some modules to be described below may be implemented by a program code and may be executed by the processing device.

The computing system 300 may receive the data d1 through the interface 310. The computing system 300 may build the virtual factory 2100, to which a situation of the real factory 1000 is reflected, by using the data d1 and may analyze the situation of the real factory 1000.

For example, the computing system 300 may be connected with the data gathering device 100 through a short range network or a long range network. The middleware system 200 may arbitrate communication between the data gathering device 100 and the computing system 300 on a network and may perform appropriate data processing for the computing system 300 by using the data processing module 220.

For example, the computing system 300 may be implemented within the real factory 1000 and may be directly accessed by the user present in the real factory 1000. Alternatively, all or a part of components of the computing system 300 may be separated from the real factory 1000 and may be remotely accessed by users present in the real factory 1000. The middleware system 200 may be separated from the computing system 300 and may be implemented inside or outside the real factory 1000.

For example, the computing system 300 may build the virtual factory 2100 that is driven in a cloud environment and may analyze a situation of the real factory 1000. For example, the computing system 300 may use AWS (Amazon Web Service), Microsoft Azure, or the like, or the computing system 300 may automatically build and use a cloud server or a web server. Accordingly, users may access the virtual factory 2100 through one or more servers and may check a result of analyzing a situation of the real factory 1000 by accessing the virtual factory 2100.

The display device 350 may display a 2D image and/or a 3D image of the analysis result 2200, which is obtained by analyzing the situation of the real factory 1000, and the virtual factory 2100 in the display panel 2000 as illustrated in FIG. 1.

The database 320 may store data such as a location and a size of each facility, the number of workers, and kinds of processes to be performed in a factory.

The database 320 may store data that are input in advance by the user. For example, to build a virtual factory, the user may input data to the database 320 before operating a computing system. For another example, before the data gathering device 100 gathers the data d01, d02, d03, d04, and d05 from the real factory 1000, the user may input data to the database 320.

Also, the database 320 may store data indicating a situation of the real factory 1000. For example, the database 320 may receive data d2 from the interface 310 and may store the data d2.

The modeling module 330 may generate modeling data by using data stored in the database 320. For example, the modeling module 330 may include a 2D, 3D modeling program and QUEST, such as Auto CAD, 3D MAX, or Pro-E, a simulation program such as eM-Plant or ARENA, or the like.

The modeling module 330 may generate modeling data associated with facilities, vehicles, products, workers, processes, and factories by using 3D computer aided design (CAD) information of facilities, vehicles, products, and workers. The modeling data may include information for displaying a configuration corresponding to the modeling data in the display panel 2000 in the shape of a 2D and/or 3D model. For example, the computing system 300 may display a 2D and/or 3D facility model in the display panel 2000 by using the facility modeling data. The database 320 may store the generated modeling data.

The virtual factory building module 340 may receive the data d2 from the interface 310. The data d2 may include a part of information included in the data d1. For example, the data d2 may include information about a size and a location of each facility, speeds of vehicles, speeds of transport containers, the number of workers, and the number and kinds of processes.

The virtual factory building module 340 may build the virtual factory 2100, to which a situation of the real factory 1000 is reflected, by using the data d2. The virtual factory building module 340 may detect modeling data corresponding to the data d2 from the database 320. The case where the database 320 generates modeling data in real time by using the data d2 will be described in detail with reference to FIG. 13.

The virtual factory building module 340 may generate data d3 by using the data d2 and the modeling data. The data d3 may include information about the virtual factory 2100 to which a situation of the real factory 1000 is reflected. The virtual factory building module 340 may output the data d3 to the display device 350.

The display device 350 may receive the data d3. The display device 350 may display a 2D image and/or a 3D image of the virtual factory 2100 in the display panel 2000 by using the data d3 as illustrated in FIG. 1.

The data analysis module 360 may receive data d4 from the interface 310. The data d4 may include a part of information included in the data d1. For example, the data d4 may include information about a processing time, a mean time to repair (MTTR), and a mean time between failures (MTBF).

The data analysis module 360 may generate data d5 by using the data d4. The data d5 may include information about a result of analyzing a current situation of the real factory 1000 and/or a result of predicting a future situation of the real factory 1000. The data analysis module 360 may output the data d5 to the display device 350.

The display device 350 may receive the data d5. The display device 350 may display the current situation of the real factory 1000 and/or the analysis result 2200 of analyzing and predicting the future situation of the real factory 1000 in the display panel 2000 by using the data d5 as illustrated in FIG. 1.

Figure 3:
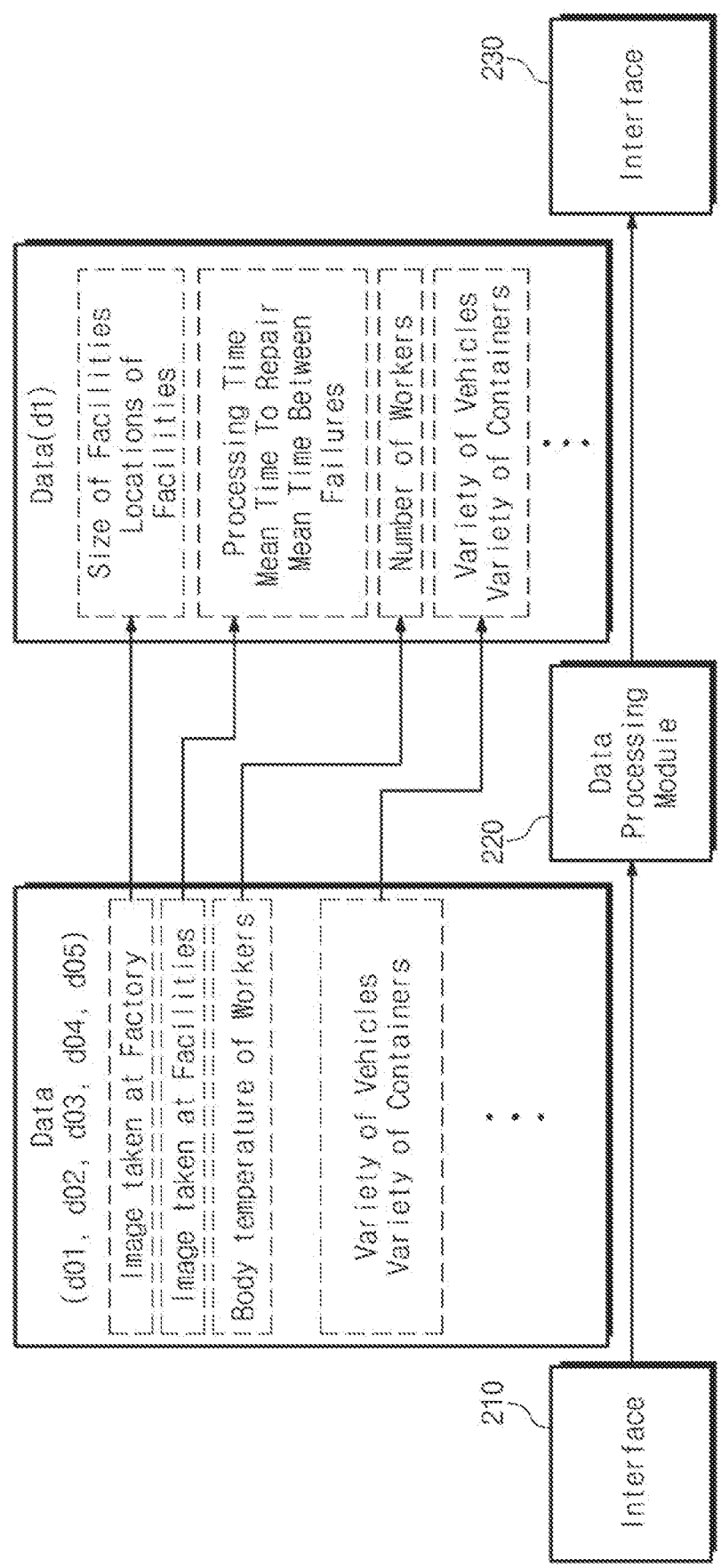
FIG. 3 is a conceptual diagram for describing an operation of a data processing module of FIG. 2.

FIG. 3 is a conceptual diagram for describing an operation of a data processing module of FIG. 2.

The data processing module 220 may generate the data d1 by using the data d01, d02, d03, d04, and d05. The data processing module 220 may generate the data d1 by processing a part of information included in the data d01, d02, d03, d04, and d05. Accordingly, the data d0 may include the same information as the part of the information included in the data d01, d02, d03, d04, and d05 or may include information obtained by converting the part of the information included in the data d01, d02, d03, d04, and d05. FIG. 3 will be described together with FIGS. 4 to 6.

Figure 4:
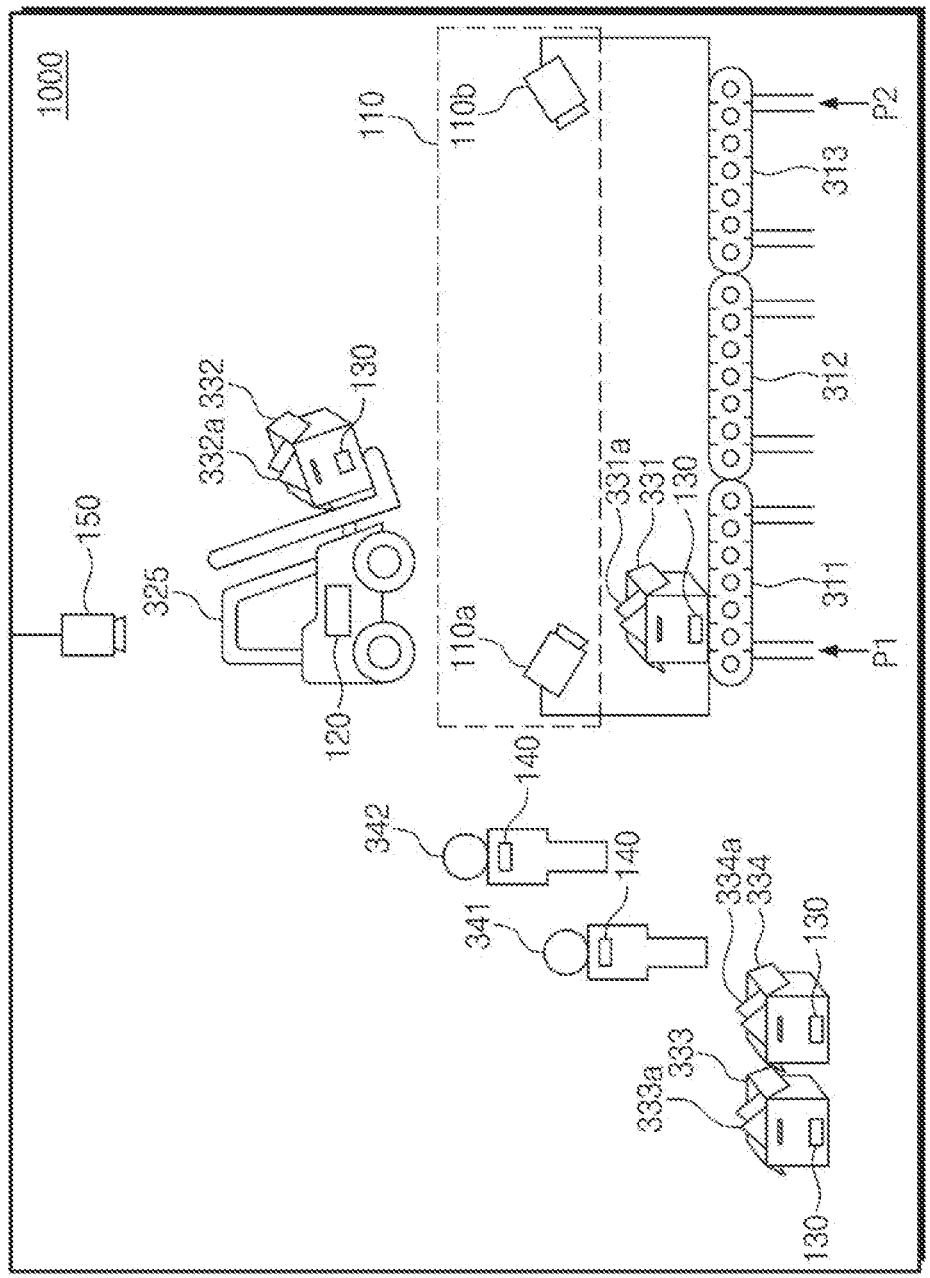
FIG. 4 is a conceptual diagram illustrating a data gathering device gathering data from a real factory of FIG. 1.

FIG. 4 is a conceptual diagram illustrating a data gathering device gathering data from a real factory of FIG. 1.

The data gathering device 100 may include the data gathering device for equipment 110, the data gathering device for vehicle 120, the data gathering device for container 130, the data gathering device for worker 140, and the data gathering device for factory 150.

The data gathering device for vehicle 120, the data gathering device for container 130, and the data gathering device for worker 140 may include a variety of sensors. The data gathering device for vehicle 120, the data gathering device for container 130, and the data gathering device for worker 140 may be attached to the vehicle 325, the transport containers 331, 332, 333, and 334, and the workers 341 and 342 by using a magnet or an adhesive material. The data gathering device for vehicle 120, the data gathering device for container 130, and the data gathering device for worker 140 may operate based on a power supplied from an external power source or based on powers supplied from batteries respectively included in the data gathering device for vehicle 120, the data gathering device for container 130, and the data gathering device for worker 140.

The data gathering device for vehicle 120 may gather the data d02 associated with a location, a speed, acceleration, and a movement direction of the vehicle 325, and the intensity of a noise, the intensity of vibration, a temperature, illuminance, and humidity of a place where the vehicle 325 is located, through the sensors.

The data gathering device for container 130 may gather the data d03 associated with a location of each of the transport containers 331, 332, 333, and 334, and the intensity of a noise, the intensity of vibration, a temperature, illuminance, and humidity of each of places where the transport containers 331, 332, 333, and 334 are located, through the sensors.

The data gathering device for worker 140 may gather the data d04 associated with a blood pressure and a body temperature of each of the workers 341 and 342, a location of each of the workers 341 and 342, and the intensity of a noise, the intensity of vibration, a temperature, illuminance, and humidity of each of places where the workers 341 and 342 are located, through the sensors.

Referring to FIG. 3, the data processing module 220 may calculate the number of workers 341 and 342 by using information about blood pressures of the workers 341 and 342. The data d1 may include information about the number of workers 341 and 342, and may include information about speeds of the vehicle 325 and the transport containers 331, 332, 333, and 334.

The data gathering device for equipment 110 may include a plurality of monitoring devices 110a and 110b. The monitoring devices 110a and 110b may monitor a part of the facilities 311 and 313 from the outside of the facilities 311 and 313. The facilities 311 and 313 may be used to perform a process. The facilities 311 and 313 may be used to perform one work included in the process. The monitoring devices 110a and 110b may be installed in the real factory 1000 and components included in the real factory 1000 for the purpose of monitoring a part of the facilities 311 and 313. For example, the monitoring devices 110a and 110b may be installed in the facilities 311 and 313, respectively. For another example, the data gathering device for equipment 110 may be installed in a surrounding area adjacent to facilities. The case where the data gathering device for equipment 110 is installed in a surrounding area adjacent to facilities will be described in detail with reference to FIG. 7.

For example, the monitoring devices 110a and 110b may monitor a part of the facilities 311 and 313 and/or one work of a process by taking a part of the facility 311 and a part of the facility 313, respectively. In this case, the monitoring devices 110a and 110b may be a photographing device such as a digital camera.

For another example, in the case where products are located at a part of the facility 311 and a part of the facility 313, the monitoring devices 110a and 110b may monitor a part of each of the facilities 311 and 313 and/or one work of a process by monitoring the product. In this case, the monitoring devices 110a and 110b may be a sensor capable of recognizing an object, such as a depth sensor or a vision sensor.

The monitoring devices 110a and 110b may recognize the data gathering device for container 130 and/or the product 331a. In the case where the product 331a is at a location P1, the monitoring device 110a may recognize the data gathering device for container 130 attached to the transport container 331 and/or the product 331a. In the case of recognizing that the product 331a is at the location P1, the monitoring device 110a may output a signal. For example, the signal may include information indicating that the product 331a is detected at the location P1. For another example, the signal may include information about an image taken by the monitoring device 110a when the product 331a is at the location P1.

In the case where the product 331a moves from the location P1 and is then located at a location P2, the monitoring device 110b may recognize the data gathering device for container 130 attached to the transport container 331 and/or the product 331a. In the case where the product 331a is at the location P2, the monitoring device 110b may output a signal. For example, the signal may include information indicating that the product 331a is detected at the location P2. For another example, the signal may include information about an image taken by the monitoring device 110a when the product 331a is at the location P2.

Each of the signals output from the monitoring devices 110a and 110b may include time information about a time when the corresponding signal is output. The data processing module 220 may calculate a time difference between a time at which the signal is output by the monitoring device 110a and a time at which the signal is output by the monitoring device 110b, by using the time information included in the signals. Accordingly, the data processing module 220 may calculate a time taken for the product 331a to move from the location P1 to the location P2.

However, the present disclosure is not limited thereto. For example, each of the monitoring devices 110a and 110b may continuously take the locations P1 and P2. Each of the monitoring devices 110a and 110b may transmit a signal, which includes information about images obtained by taking the locations P1 and P2, to the data processing module 220 in real time. The signal may include information about times at which the images are taken. The data processing module 220 may process the signal to obtain time information about times at which the product 331a is taken at the locations P1 and P2.

The monitoring devices 110a and 110b may be installed at opposite ends of a facility, or may be installed at a start location and an end location of one process, which will be described in detail with reference to FIG. 6.

However, the present disclosure is not limited thereto. For example, the data gathering device for equipment 110 may include sensors. In this case, the sensors may be attached to the facilities 311, 312, and 313 to gather data associated with the intensity of a noise, the intensity of vibration, a temperature, illuminance, and humidity of each of places where the facilities 311, 312, and 313 are located.

The data gathering device for factory 150 may gather data associated with the whole structure of the real factory 1000 and the whole situation of the real factory 1000. The data gathering device for factory 150 may monitor the whole appearance of the real factory 1000. The data gathering device for factory 150 may be installed on an inner wall of the real factory 1000 to monitor the whole appearance of the real factory 1000. The data gathering device for factory 150 may be one of devices such as a digital camera, a depth camera, and a vision sensor.

The data processing module 220 may calculate a size and a location of each of the facilities 311, 312, and 313 by using an image taken by the data gathering device for factory 150 and/or a signal output from the data gathering device for factory 150. The data processing module 220 may calculate kinds, the number, and scales of processes by using the image taken by the data gathering device for factory 150 and/or the signal output from the data gathering device for factory 150.

Figure 5:
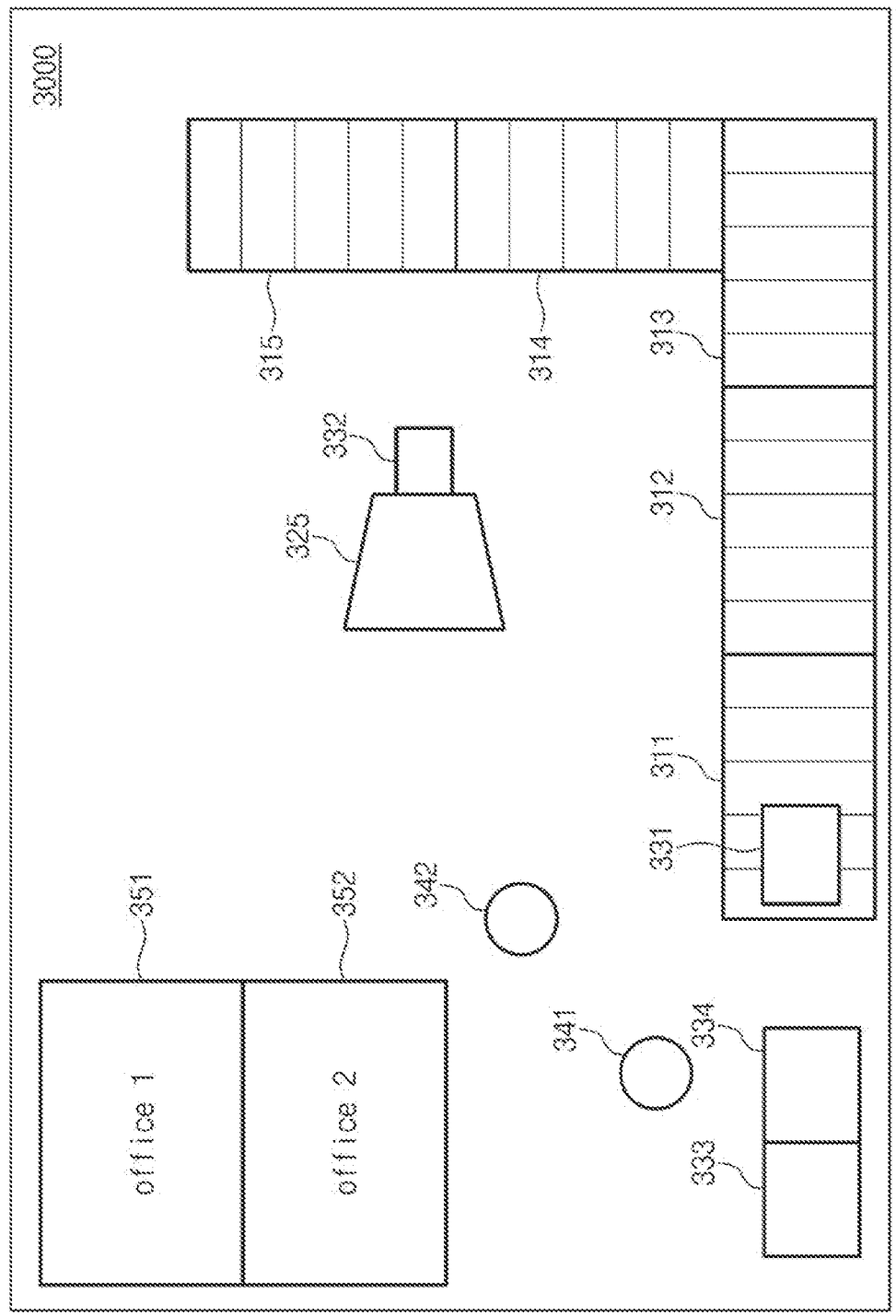
FIG. 5 is a conceptual diagram illustrating an image taken by a data gathering device for factory of FIG. 4.

FIG. 5 is a conceptual diagram illustrating an image taken by a data gathering device for factory of FIG. 4.

The data gathering device for factory 150 may take the whole appearance of the real factory 1000. An image 3000 taken by the data gathering device for factory 150 may include information about a structure of the real factory 1000 and the whole situation of the real factory 1000. For example, the image 3000 may include information about a size and a location of each of facilities 311, 312, 313, 314, and 315 and offices 351 and 352.

Referring to FIG. 3, the data processing module 220 may calculate the size and location of each of the facilities 311, 312, 313, 314, and 315 by using the image 3000. The data d1 may include information about the size and location of each of the facilities 311, 312, 313, 314, and 315, instead of the image 3000. The data processing module 220 may convert the information about the image 3000 into information about the size and the location of each of the facilities 311, 312, 313, 314, and 315 such that the amount of data d1 output from the data processing module 220 decreases.

Figure 6:
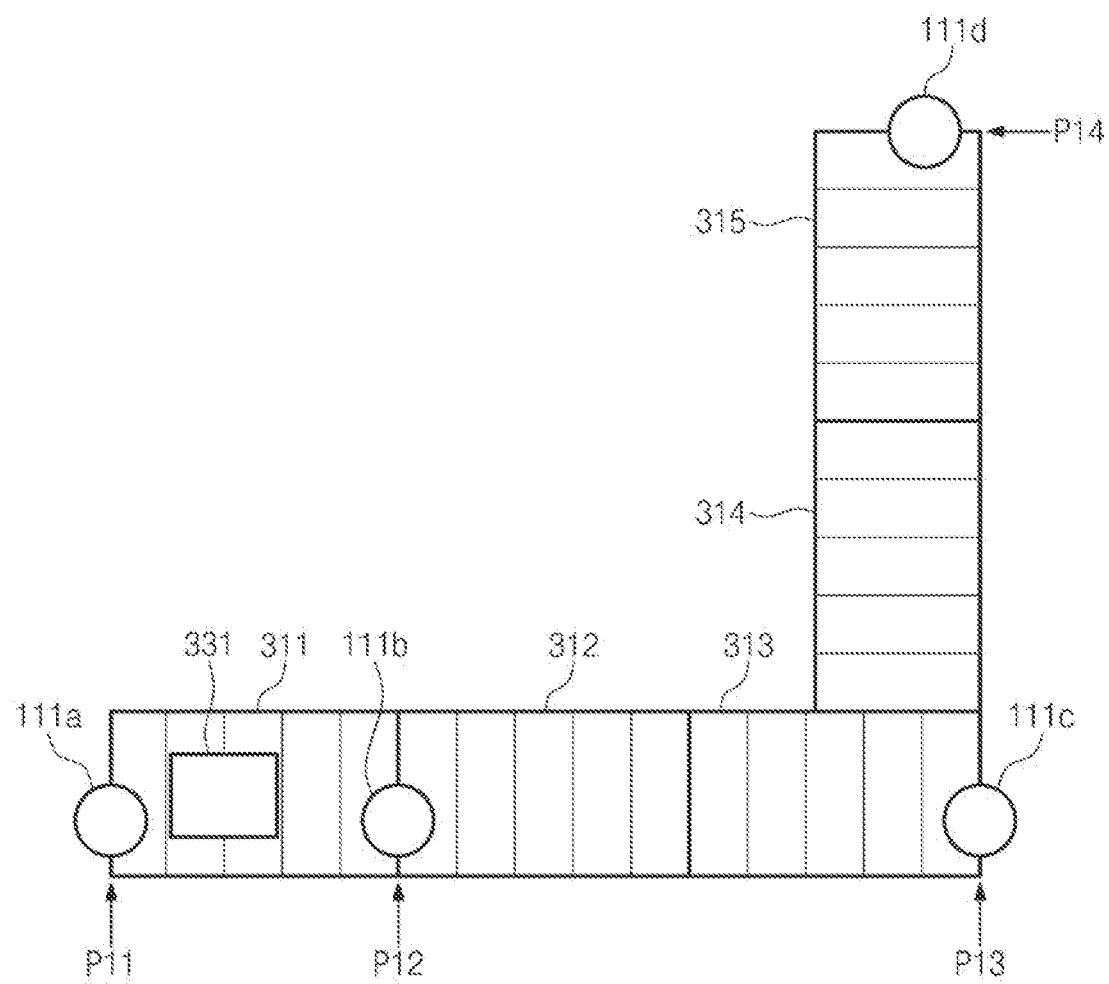
FIG. 6 is a conceptual diagram illustrating an example method of gathering data by monitoring devices of FIG. 4.

FIG. 6 is a conceptual diagram illustrating an example method of gathering data by monitoring devices of FIG. 4.

The data gathering device for equipment 110 may monitor a part of the facilities 311, 312, 313, 314, and 315 by using monitoring devices 111a, 111b, 111c, and 111d. In the case where the facilities 311, 312, 313, 314, and 315 are used in one process, the data gathering device for equipment 110 may monitor one work of the process by using the monitoring devices 111a, 111b, 111c, and 111d. Referring to FIG. 3, the data processing module 220 may calculate a processing time, a mean time to repair (MTTR), and a mean time between failures (MTBF) by using a signal output from the data gathering device for equipment 110. The data processing module 220 may convert information included in the signal into information about the processing time, the mean time to repair, and the mean time between failures such that the amount of data d1 output from the data processing module 220 decreases.

The monitoring devices 111a and 111b may be installed at opposite ends P11 and P12 of the facility 311. While the transport container 331 moves from the location P11 to the location P12, the facility 311 may perform one work. The data processing module 220 may calculate a processing time taken for the facility 311 to perform a work, a mean time to repair of the facility 311, and a mean time between failures of the facility 311, by using signals output from the monitoring devices 111a and 111b.

The monitoring devices 111a and 111c may be respectively installed at ends P11 and P13 of the facilities 311 and 313 as described with reference to FIG. 4. While the transport container 331 moves from the location P11 to the location P13, the facilities 311, 312, and 313 may perform one work. The data processing module 220 may calculate a processing time taken for the facilities 311, 312, and 313 to perform a work, by using signals output from the monitoring devices 111a and 111c.

The monitoring devices 111a and 111d may be respectively installed at ends P11 and P14 of the facilities 311 and 315. While the transport container 331 moves from the location P11 to the location P14, the facilities 311 to 315 may perform one work. The data processing module 220 may calculate a processing time taken for the facilities 311 to 315 to perform a process, by using signals output from the monitoring devices 111a and 111d.

The data gathering device for equipment 110 may include a plurality of monitoring devices to monitor a product that moves over time. According to an embodiment of the present disclosure, a plurality of monitoring devices may be easily be attached or installed to or in facilities. Accordingly, even in the case where a facility incapable of automatically measuring a processing time is used in the real factory 1000, the present disclosure may easily gather data associated with a processing time of a facility by using a plurality of monitoring devices.

Figure 7:
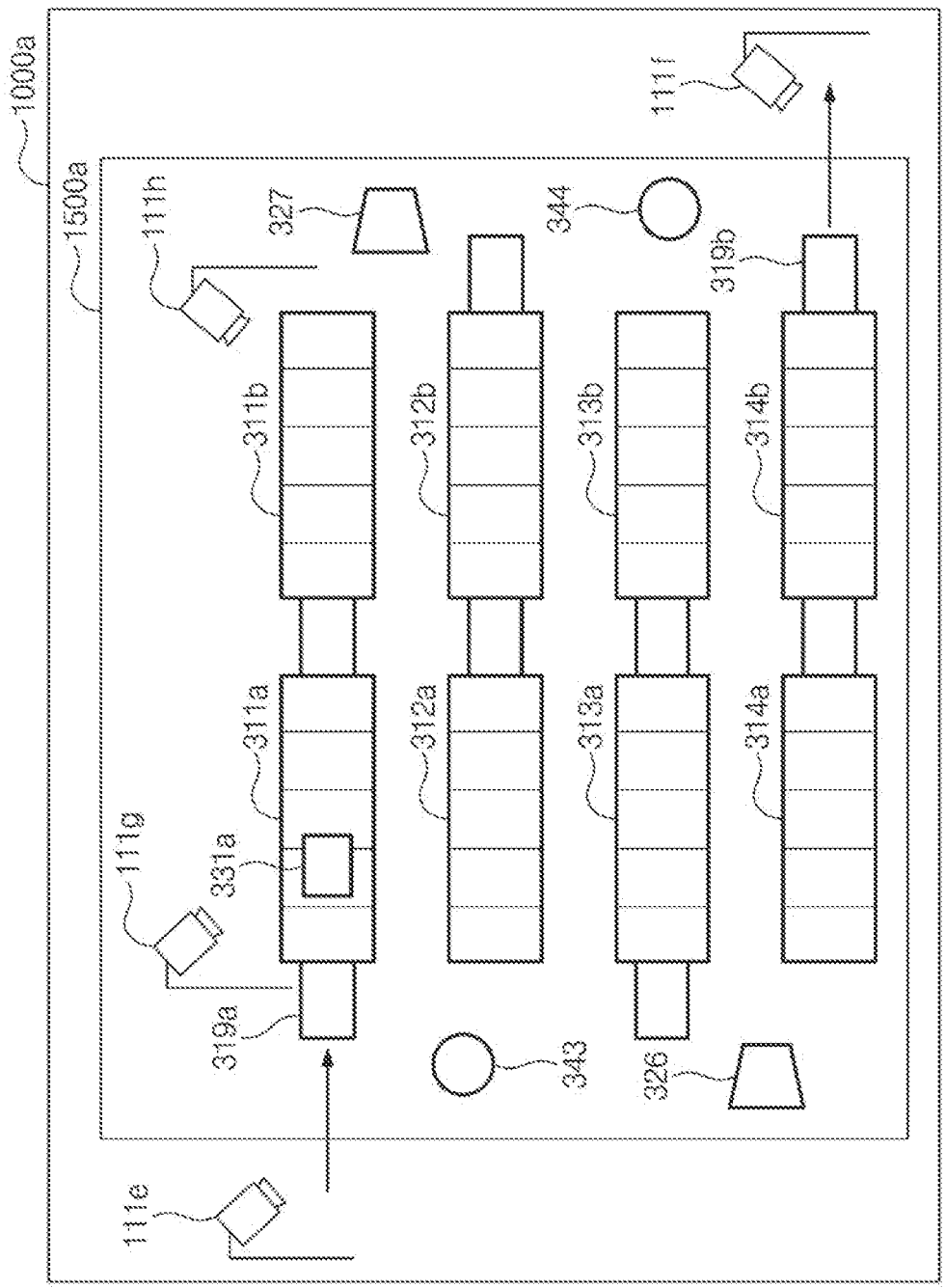
FIG. 7 is a conceptual diagram illustrating an example method of gathering data by monitoring devices of FIG. 4.

FIG. 7 is a conceptual diagram illustrating an example method of gathering data by monitoring devices of FIG. 4.

One process 1500*a* may be performed in a factory 1000*a* illustrated in FIG. 7. Facilities 311*a* to 314*a* and 311*b* to 314*b*, workers 343 and 344, and vehicles 326 and 327 may be required to perform the process 1500*a*. The process 1500*a* may include a series of works. The works may be performed by the facilities 311*a* to 314*a* and 311*b* to 314*b*. However, the present disclosure is not limited thereto. For example, a plurality of processes may be performed in the factory 1000*a*, and the process 1500*a* may be performed by one or more facilities, one or more workers, one or more vehicles, and one or more transport containers.

The data gathering device for equipment 110 may monitor a work, which is performed by the process 1500*a* and/or the facilities 311*a* to 314*a* and 311*b* to 314*b*, by using monitoring devices 111*e*, 111*f*, 111*g*, and 111*h*.

The process 1500*a* may start from the facility 311*a* and may be completed at the facility 314*b*. The facilities 311*a* and 314*b* may include a load device 319*a* and an unload device 319*b*, respectively. However, the present disclosure is not limited thereto. For example, the load device 319*a* and the unload device 319*b* may be devices independent of the facilities 311*a* and 314*b*. The load device 319*a* may be used to load the product 331*a* onto the facility 311*a*. The unload device 319*b* may be used to unload the product 331*a* from the facility 314*b*.

The monitoring devices 111*e* and 111*f* may monitor a start portion of the process 1500*a* and a complete portion of the process 1500*a*, respectively. In detail, the monitoring devices 111*e* and 111*f* may monitor the load device 319*a* and the unload device 319*b*, respectively. For example, the monitoring devices 111*e* and 111*f* may be installed in surrounding areas adjacent to the facilities 311*a* and 314*b*. For another example, the monitoring devices 111*e* and 111*f* may be installed in surrounding areas adjacent to the load device 319*a* and surrounding areas adjacent to the unload device 319*b*.

The data processing module 220 may calculate a tact time, a neck time, a cycle time of each process, and a net cycle time of each process, by using signals output from the monitoring devices 111*e* and 111*f*. The monitoring devices 111*g* and 111*h* may correspond to the monitoring devices 110*a* and 110*b* illustrated in FIG. 4. The monitoring devices 111*g* and 111*h* may be installed in surrounding areas adjacent to the facilities 311*a* and 311*b*. Below, the descriptions given above are omitted to avoid redundancy.

That is, the data gathering device for equipment 110 may gather data associated with process 1500*a*, as well as data associated with the facilities 311*a* to 314*a* and 311*b* to 314*b*. The present disclosure may obtain an analysis result of high reliability with respect to the process 1500*a* and the factory 1000*a* by gathering data associated with the process 1500*a* independently of the facilities 311*a* to 314*a* and 311*b* to 314*b*.

Also, direct installation in the facilities 311*a* to 314*a* and 311*b* to 314*b* and the devices 319*a* and 319*b* may be possible, and in addition, easy installation in surrounding areas adjacent to the facilities 311*a* to 314*a* and 311*b* to 314*b* and the devices 319*a* and 319*b* may be possible. Accordingly, even in the case where a part of the facilities 311*a* to 314*a* and 311*b* to 314*b* is under failure, highly reliable data associated with the facilities 311*a* to 314*a* and 311*b* to 314*b* and the process 1500*a* may be gathered.

Figure 8:
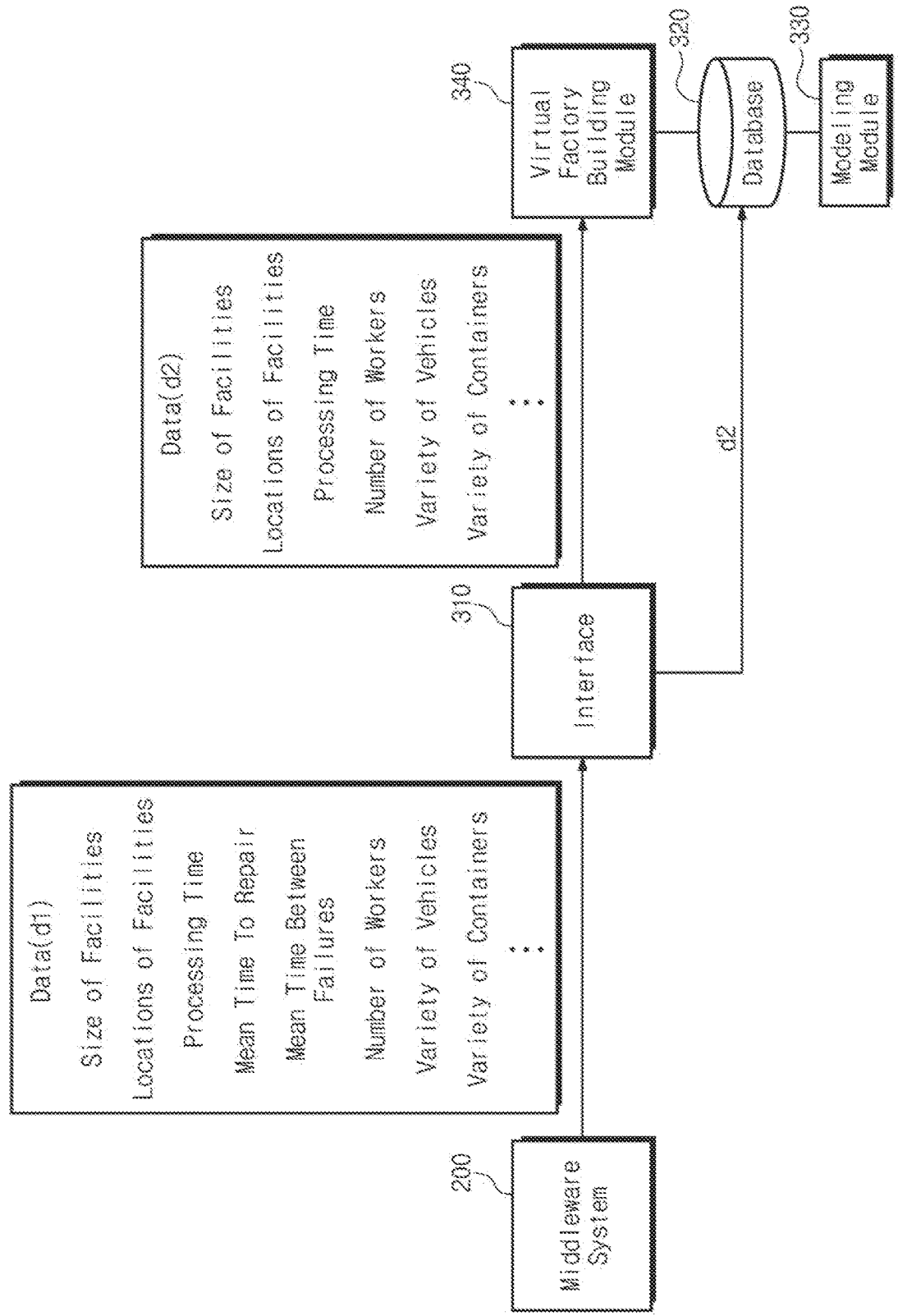
FIG. 8 is a conceptual diagram for describing an operation of a virtual factory building module of FIG. 2.
Figure 9:
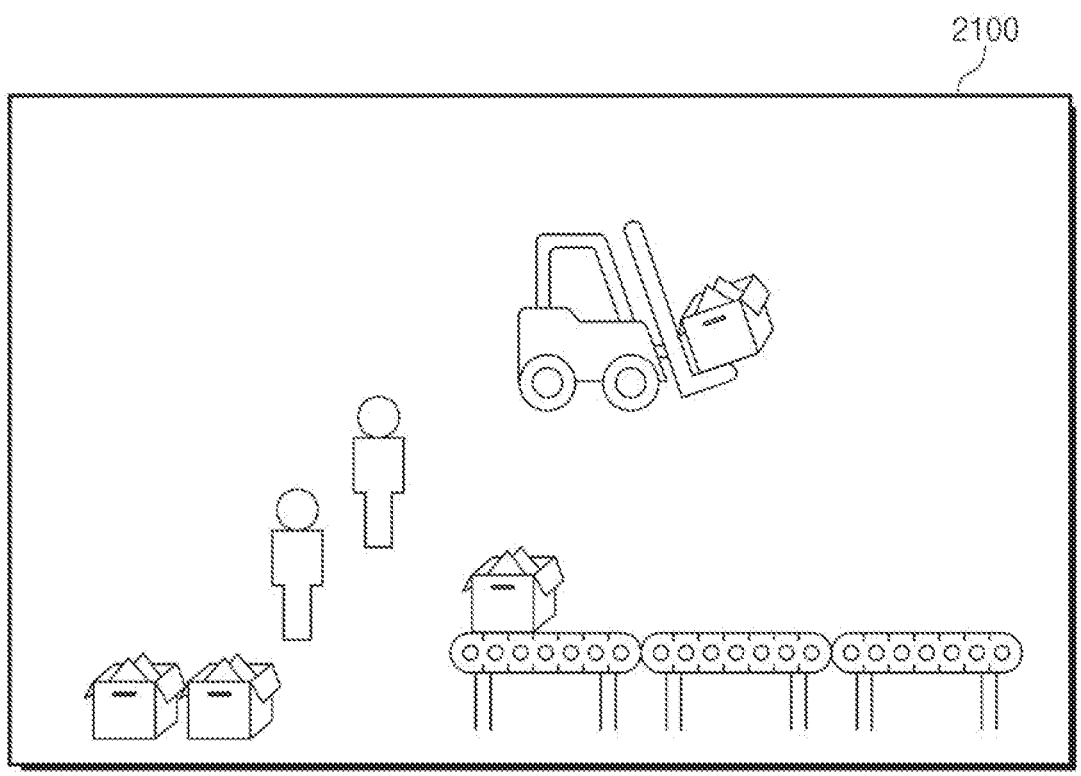
FIG. 9 is a conceptual diagram illustrating a virtual factory displayed in a display panel of FIG. 2.

FIG. 8 is a conceptual diagram for describing an operation of a virtual factory building module of FIG. 2. FIG. 9 is a conceptual diagram illustrating a virtual factory displayed in a display panel of FIG. 2. For better understanding, FIGS. 1, 8, and 9 will be referenced together.

Referring to FIG. 8, the virtual factory building module 340 may receive the data d2 from the interface 310. As described with reference to FIG. 2, the data d2 may include a part of information included in the data d1. The data d2 may include only information necessary to build the virtual factory 2100 from among the information included in the data d1. For example, the data d2 may include information about a size, a location, and a processing time of each facility, speeds of vehicles, speeds of transport containers, and the number of workers.

The virtual factory building module 340 may build the virtual factory 2100, to which a structure and a work situation of the real factory 1000 are reflected, by using the data d2. For example, the virtual factory building module 340 may build the virtual factory 2100 by disposing facility models at the virtual factory 2100 by using the information about the location of each facility included in the data d2.

The database 320 may store information about the data d2 and/or the built virtual factory 2100. The modeling module 330 may support visualization of the virtual factory 2100 based on the information stored in the database 320. Referring to FIG. 9, the display device 350 may provide the user with a visualized shape of the virtual factory 2100 through the display panel 2000.

Figure 10:
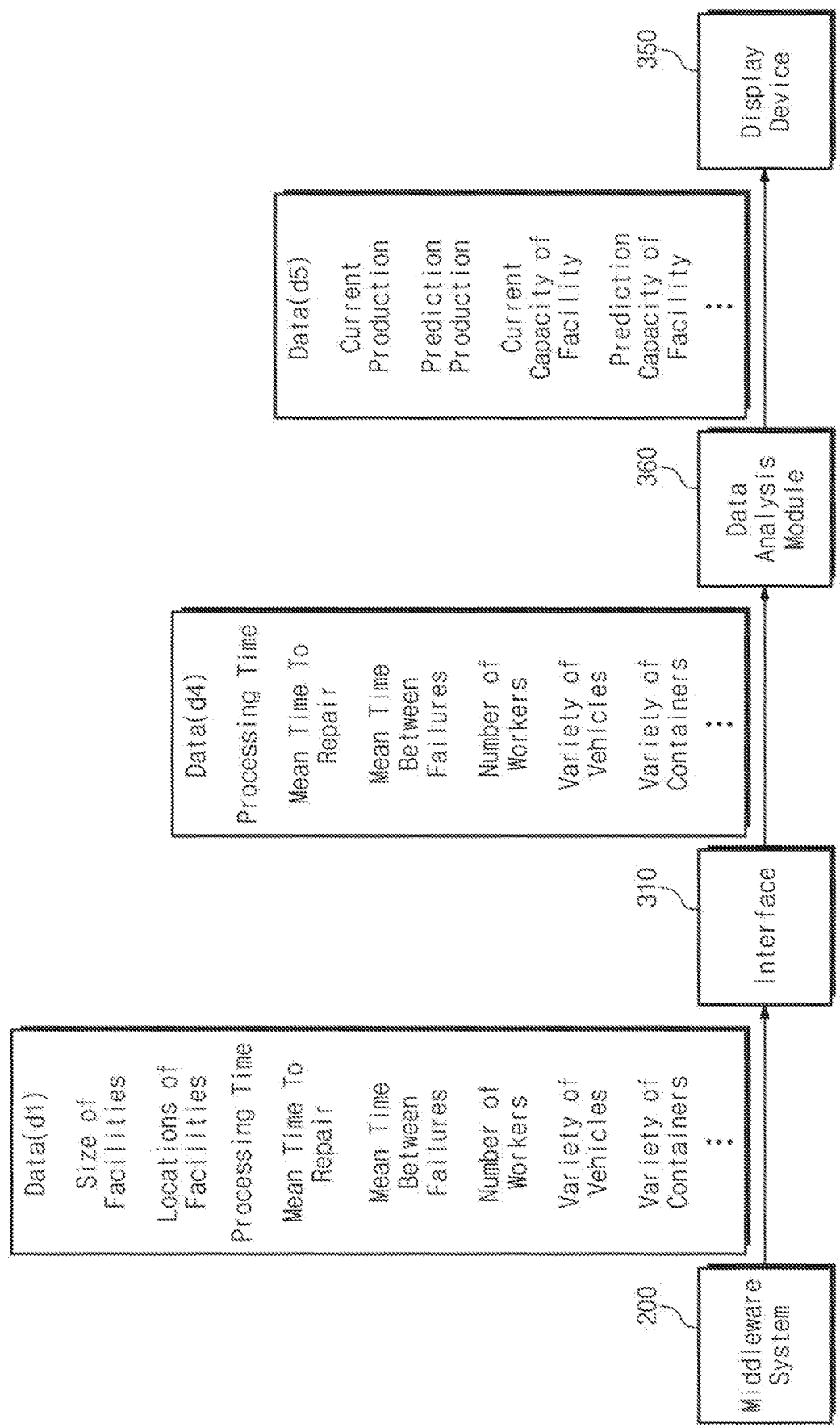
FIG. 10 is a conceptual diagram for describing an operation of a data analysis module of FIG. 2.
Figure 11:
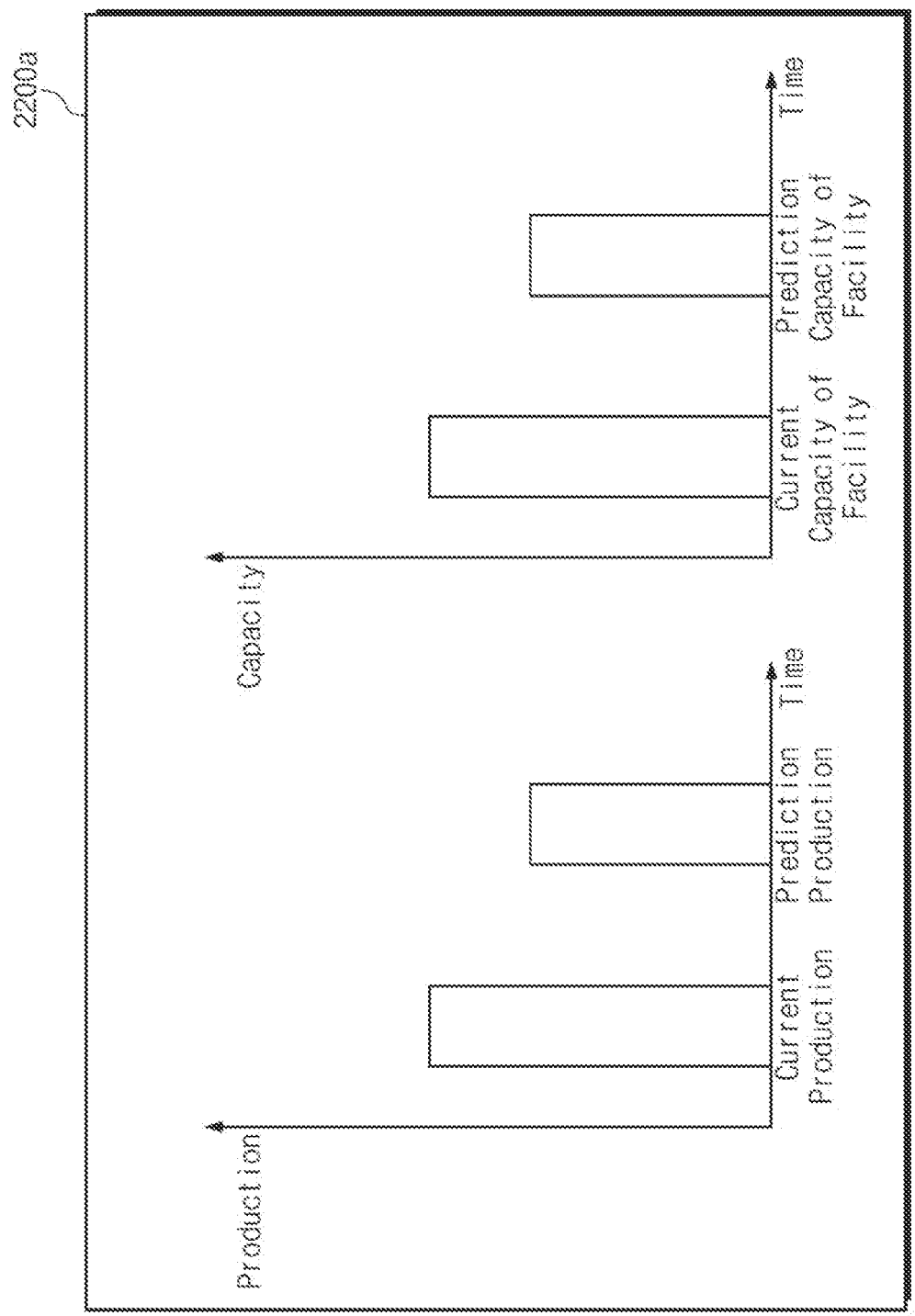
FIG. 11 is a conceptual diagram illustrating an analysis result of a real factory displayed in a display panel of FIG. 2.

FIG. 10 is a conceptual diagram for describing operation of a data analysis module of FIG. 2. FIG. 11 is a conceptual diagram illustrating an analysis result of a real factory displayed in a display panel of FIG. 2. For better understanding, FIGS. 1, 10, and 11 will be referenced together.

Referring to FIG. 10, the data analysis module 360 may receive the data d4 from the interface 310. The data d4 may include a part of information included in the data d1. The data d4 may include only information necessary to analyze a current situation of the real factory 1000 and to predict a future situation of the real factory 1000 from among the information included in the data d1. For example, the data d4 may include information about a processing time, a mean time to repair, a mean time between failures, speeds of vehicles, speeds of transport containers, and the number of workers.

The data analysis module 360 may generate the data d5 by using the data d4. The data d5 may include information that is useful for the user to make a decision about a real factory.

For example, the data d5 may include information about primary KPIs (Key Performance Indicators) of a factory.

For another example, the data d5 may include information about a result of analyzing a current situation of the real factory 1000 and/or a result of predicting a future situation of the real factory 1000. Referring to FIG. 6, based on the signals output from the monitoring devices 111*a* and 111*c*, the data analysis module 360 may analyze a progress situation of a first work that is performed while the transport container 331 is moved from the location P11 to the location P13. After the first work starts, a second work may start from the facility 311. The second work may be performed by the facilities 311, 312, and 313. The data analysis module 360 may predict a progress situation of the second work based on the signals output from the monitoring devices 111*a* and 111*c*.

For another example, the data d5 may include information about the production of products, an operating state of a facility, a progress situation of a process, and the like. In detail, the data d5 may include information about a current lead time of a product, a predicted lead time of the product, a current production of the product, a predicted production of the product, a trend in production, a current stock of the product, a predicted stock of the product, a trend in product inventory, a tact time, a neck time, a cycle time for each process, a net cycle time for each process, a current capacity for each process, a predicted capacity for each process, a current work-in-process stock for each process, a predicted work-in-process stock of each process, a current capacity of each facility, predicted operation, congestion, waiting, and failure of each facility, current capacity of each transport device, predicted operation, congestion, waiting, and failure of each transport device, a congestion interval of a current process, and strength of each neck process.

The information included in the data d5 may be displayed in the display panel 2000. Referring to FIG. 11, the display device 350 may display a current situation of the real factory 1000 and the analysis result 2200 of a future situation of the real factory 1000 through the display panel 2000 in the shape of a graph or a chart. For example, the analysis result 2200 may display current production, predicted production of the real factory 1000, a current capacity of a facility, and a predicted capacity of a facility.

The user may grasp a current situation and a predicted situation of the real factory 1000 with reference to the analysis result 2200 displayed in the display panel 2000. With reference to the analysis result 2200, the user may establish a producing plan capable of optimally maintaining the real factory 1000.

Figure 12:
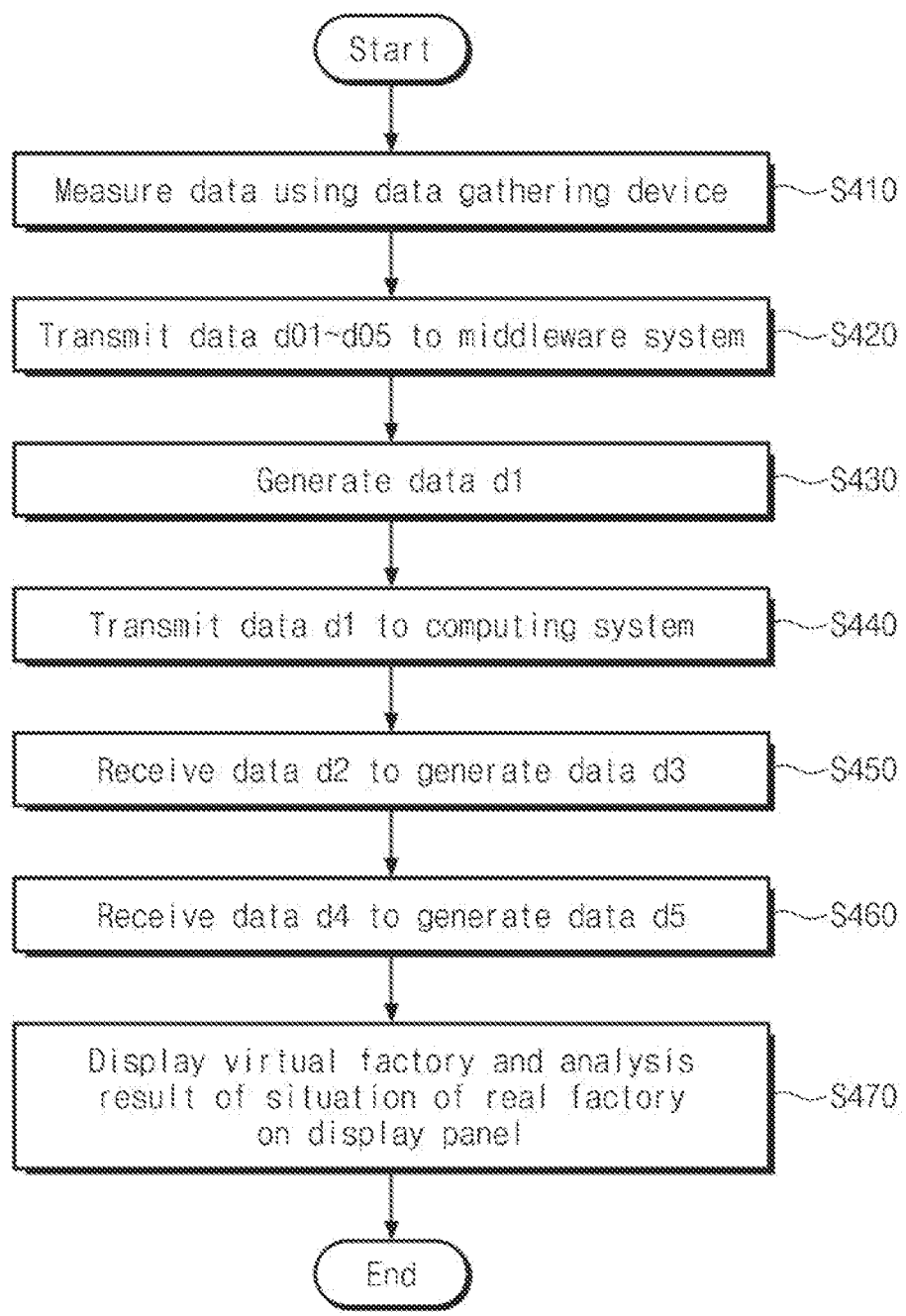
FIG. 12 is a flowchart for describing a method of displaying a virtual factory and an analysis result of a situation of a real factory in a display panel of FIG. 2.

FIG. 12 is a flowchart for describing a method of displaying a virtual factory and an analysis result of a situation of a real factory in a display panel of FIG. 2. For better understanding, FIG. 2 will be referenced together.

In operation S410, the data gathering device 100 may gather the data d01, d02, d03, d04, and d05 associated with the real factory 1000.

In operation S420, the data gathering device 100 may transmit the gathered data d01, d02, d03, d04, and d05 to the middleware system 200.

In operation S430, the middleware system 200 may receive the gathered data d01, d02, d03, d04, and d05. The middleware system 200 may generate the data d1 by processing the gathered data d01, d02, d03, d04, and d05 through the data processing module 220.

In operation S440, the middleware system 200 may transmit the data d1 to the computing system 300. The computing system 300 may receive the data d1.

In operation S450, the virtual factory building module 340 may receive the data d2. The virtual factory building module 340 may generate the data d3 by using the data d2. The data d3 may include information about a virtual factory. The virtual factory building module 340 may output the data d3 to the display device 350. Operation S450 will be described in detail with reference to FIG. 13.

In operation S460, the data analysis module 360 may receive the data d4. The data analysis module 360 may generate the data d5 by using the data d4. The data d5 may include information about a result of analyzing a situation of a real factory. The data analysis module 360 may output the data d5 to the display device 350.

In operation S470, the display device 350 may receive the data d3 and the data d5. The display device 350 may display a 2D image and/or a 3D image of the virtual factory 2100 and the analysis result 2200 of the situation of the real factory 1000 in the display panel 2000 by using the data d3 and d5.

FIG. 13 is a flowchart for describing a method of building a virtual factory at a virtual factory building module of FIG. 2. Operation S515 to operation S560 illustrated in FIG. 13 correspond to operation S450 described with reference to FIG. 12.

In operation S510, the interface 310 may receive the data d1 from the middleware system 200.

In operation S515, the interface 310 may transmit the data d2 to the virtual factory building module 340 based on the received data d1.

In operation S520, the interface 310 may transmit the data d2 to the database 320.

In operation S525, the database 320 may store the data d2.

In operation S530, the database 320 may transmit the data d2 to the modeling module 330.

In operation S535, the modeling module 330 may generate modeling data corresponding to the data d2 by using the data d2.

In operation S540, the modeling module 330 may transmit the modeling data to the database 320.

In operation S545, the database 320 may store the modeling data. The database 320 may store information about a correspondence relationship between the modeling data and the data d2. Through operation S525 to operation S545, the database 320 may store the modeling data, the data d2, and the information about the correspondence relationship between the modeling data and the data d2. When the modeling data, the data d2, and the information about the correspondence relationship between the modeling data and the data d2 are stored in the database 320, the virtual factory building module 340 may detect the modeling data corresponding to the data d2 from the database 320.

In operation S550, the database 320 may transmit the modeling data to the virtual factory building module 340.

In operation S555, the virtual factory building module 340 may generate the data d3 by using the data d2 and the modeling data. The data d3 may include information about the virtual factory 2100 to which a situation of the real factory 1000 is reflected.

In operation S560, the virtual factory building module 340 may transmit the data d3 to the display device 350.

In operation S565, the display device 350 may output a visualized shape of the virtual factory 2100 through the display panel 2000 based on the data d3.

The above description refers to detailed embodiments for carrying out the present disclosure.

As well as the embodiments described above, embodiments in which a design is changed simply or which are easily changed may be included in the present disclosure.

In addition, technologies that may be easily changed and carried out by using the embodiments of the present disclosure may be included.

While the inventive concept has been described with reference to exemplary embodiments thereof, it will be apparent to those of ordinary skill in the art that various changes and modifications may be made thereto without departing from the spirit and scope of the inventive concept as set forth in the following claims.

The invention claimed is:

1. A computing system for building a virtual factory, comprising:
  a database configured to store modeling data;
  a display; and a virtual factory building module executing on the computing system, wherein the virtual factory building module is configured to:

generate the virtual factory in which a progress situation of a work performed from a first portion to a second portion is displayed on the display, based on:

the modeling data, and a time difference between a first output time of a first signal and a second output time of a second signal, wherein the first output time occurs when a product is at a first portion of one or more facilities monitored from a first location outside the one or more facilities in a real factory and the second output time occurs when the product is at a second portion of the one or more facilities monitored from a second location outside the one or more facilities, wherein the first location is spaced from the second location, and wherein the first portion is spaced from the second portion.

2. The computing system of claim 1, wherein the first signal includes information about an image of the first portion taken from the first location in the real factory when the product is at the first portion, and wherein the second signal includes information about an image of the second portion taken from the second location in the real factory when the product is at the second portion.

3. The computing system of claim 1, wherein the virtual factory building module is configured to generate the virtual factory to which a situation of the real factory is reflected, based on data gathered from the real factory and the modeling data.

4. The computing system of claim 1, further comprising:

a data analysis module configured to analyze the progress situation of the work based on the time difference.

5. A method of using a computing system to analyze a situation of a real factory, the method comprising:

when a product is at a first portion of one or more facilities used to produce the product in the real factory, outputting a first signal by a first monitoring device monitoring the first portion from a first location outside of the one or more facilities;

when the product is at a second portion of the one or more facilities different from the first portion, outputting a second signal by a second monitoring device monitoring the second portion from a second location outside of the one or more facilities;

calculating a time difference between a time when the product is at the first portion and a time by a data processing module, when the product is at the second portion, based on the first signal and the second signal; and analyzing, by the computing system, a progress situation of a first work performed from the first portion to the second portion based on the time difference.

6. The method of claim 5, further comprising:

displaying an analysis result of analyzing the progress situation of the first work in a display panel in a visualized shape.

7. The method of claim 5, further comprising:

predicting a progress situation of a second work based on the time difference by the computing system, wherein the second work is performed from the first portion to the second portion after the first work is performed.

8. The method of claim 5, further comprising:

when the first portion and the second portion are at one facility of the one or more facilities, analyzing an operation state of the one facility based on the time difference by the computing system.

9. The method of claim 8, wherein the time difference is a processing time of the one facility, further comprising:

calculating a mean time to repair (MTTR) and a mean time between failures (MTBF) of the one facility based on the processing time by the computing system, wherein the analyzing of the operation state of the one facility includes analyzing the operation state of the one facility based on the processing time, the mean time to repair, and the mean time between failures by the computing system.

10. The method of claim 5, further comprising:

when the product is produced through a process which starts from a first facility of the one or more facilities and is completed at a second facility of the one or more facilities, when the first portion is on the first facility, and when the second portion is on the second facility, analyzing the progress situation of the process based on the time difference by the computing system.

* * * * *